(12) United States Patent
Hirano et al.

(10) Patent No.: US 7,895,339 B2
(45) Date of Patent: Feb. 22, 2011

(54) NETWORK MANAGING METHOD AND NETWORK MANAGING APPARATUS

(75) Inventors: Jun Hirano, Kanagawa (JP); Chan Wah Ng, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 453 days.

(21) Appl. No.: 11/817,917

(22) PCT Filed: Mar. 7, 2006

(86) PCT No.: PCT/JP2006/304834
§ 371 (c)(1),
(2), (4) Date: Jan. 30, 2008

(87) PCT Pub. No.: WO2006/095893
PCT Pub. Date: Sep. 14, 2006

(65) Prior Publication Data
US 2009/0265453 A1    Oct. 22, 2009

(30) Foreign Application Priority Data
Mar. 8, 2005    (JP) .............................. 2005-064269

(51) Int. Cl.
G06F 15/16    (2006.01)
(52) U.S. Cl. ....................... 709/227; 709/238; 370/313; 370/338; 370/351
(58) Field of Classification Search .................. 709/227, 709/230, 237, 238, 242; 370/389, 395.3, 370/313, 338, 351
See application file for complete search history.

(56) References Cited

U.S. PATENT DOCUMENTS

| 6,636,498 | B1 | 10/2003 | Leung |
| 2003/0095523 | A1 | 5/2003 | Korus |
| 2003/0117965 | A1 | 6/2003 | Markki |
| 2004/0100951 | A1* | 5/2004 | O'Neill ....................... 370/389 |
| 2004/0888430 | | 5/2004 | Busi et al. |
| 2004/0179688 | A1 | 9/2004 | Lee |

(Continued)

FOREIGN PATENT DOCUMENTS

EP    1416682    5/2004

(Continued)

OTHER PUBLICATIONS

D. Johnson, et al. "Mobility Support in IPv6," Network Working Group, Jun. 2004, pp. 1-165, p. 8, line 6.

(Continued)

*Primary Examiner*—David Lazaro
(74) *Attorney, Agent, or Firm*—Dickinson Wright PLLC

(57) ABSTRACT

In order to verify if upper-level router information, or ULRI (information on the upper-level router with respect to a predetermined node) is valid, MN (Mobile Node) 220 associated to ULMR (Upper-Level Mobile Router) 210 acquires ULRI such as the address of ULMR (310), inserts ULRI into a BU (Binding Update) message, and sends it to HA (Home Agent) 235 (320). On receiving the BU message with ULRI, HA sends a BA (Binding Acknowledgement) message set to pass through the router that is specified in ULRI (330). If ULRI is valid, ULMR forwards the BA message to MN (340). If ULRI is not valid, ULMR discards the BA message.

21 Claims, 9 Drawing Sheets

U.S. PATENT DOCUMENTS

2004/0202183 A1* 10/2004 Thubert et al. ......... 370/395.31
2005/0041634 A1 2/2005 Aura
2006/0120315 A1* 6/2006 Olivereau et al. ........... 370/313

FOREIGN PATENT DOCUMENTS

WO 2004072807 8/2004

OTHER PUBLICATIONS

V. Devarapalli, et. al., "Network Mobility (NEMO) Basic Support Protocol," NEMO Working Group, Internet Draft: draft-ietf-nemo-basic-support-02.txt, Dec. 2003, pp. 1-37, p. 8, line 9.

P. Thubert, et al., "IPv6 Reverse Routing Header and its application to Mobile Networks," Network Working Group, Internet Draft: draft-thubert-nemo-reverse-routing-header-05, Jun. 2004, pp. 1-42, p. 8, line 12.

C. Ng, et al., "Securing Nested Tunnels Optimization with Access Router Option, " NEMO Working Group, Internet Draft: draft-ng-nemo-access-router-option-01, Jul. 12, 2004, pp. 1-47, p. 8, line 16.

Hong-Sun Jun, et al. "Performance analysis of multicast-based localized mobility support scheme in IPv6 networks," Communication Networks and Services Research, May 2004, pp. 243-248.

Zhao S, et al. "Extensions on Return Routability Test in MIP6; draft-zhao-mip6-rr-ext-01.txt;" IETF Standard-Working-Draft, Internet Engineering Task Force, IETF, Feb. 2005, Chap. 1.

PCT International Search Report dated Jul. 12, 2006.

* cited by examiner

NETWORK MANAGING METHOD AND NETWORK MANAGING APPARATUS

TECHNICAL FIELD

The present invention is related to the network managing method and network managing apparatus. The network managing method and network managing apparatus are especially related to communication technology using Internet Protocol (IP), to the technology of route optimization among communication nodes using Mobile IPv6, and to the security technology to improve security of communication networks.

BACKGROUND ART

Many devices today communicate with each other using the IP network. In order to provide mobility support to mobile devices, the Internet Engineering Task Force (IETF) has developed the "Mobility Support in IPv6" of the following non-patent document 1. In Mobile IP, each mobile node has a permanent home domain. When the mobile node is attached to its home network, it is assigned a primary global address known as a home-address (HoA). When the mobile node is away, i.e. attached to some other foreign networks, it is usually assigned a temporary global address known as a care-of-address (CoA). The idea of mobility support is such that the mobile node can be reached at the home-address even when it is attached to other foreign networks. This is done in the non-patent document 1 with an introduction of an entity at the home network known as a home agent (HA). Mobile nodes register their care-of-addresses with the home agents using messages known as Binding Updates (BU). This allows the home agent to create a binding between the home-address and care-of-address of the mobile node. The home agent is responsible to intercept messages that are addressed to the mobile node's home-address, and forward the packet to the mobile node's care-of-address using packet encapsulation (i.e. putting one packet as the payload of a new packet, also known as packet tunneling).

Although this enables mobility support, a problem known as sub-optimal or dog-leg routing arises. This is because when a mobile node communicates with a correspondent node (CN), packets sent between them must go through the home agent. For this reason, the non-patent document 1 specifies that the mobile node can send a BU to the correspondent node. Once the correspondent node knows of the binding between the home-address and care-of-address of the mobile node, packets traversing between them can be directly routed to and from the care-of-address of the mobile node (without going through the home agent). However, security is now a concern. BU sent from the mobile node to its home agent can be secured, because it is assumed that the mobile node and its home agent share a security association. Such an assumption becomes unrealistic for a mobile node and a correspondent node.

For this, the non-patent document 1 specified a procedure known as the Return Routability (RR) procedure, which allows the correspondent node to ascertain that the home-address and care-of-address specified in a BU are indeed collocated. In essence, the RR procedure requires the mobile node to obtain two securely generated tokens from the correspondent node prior to sending it a BU. To initiate the RR procedure, the mobile node first sends the correspondent node two different messages: a Home-Test-Init (HoTI) message, and a Care-of-Test-Init (CoTI) message. The HoTI is sent via the home agent with the mobile node's home-address as the packet source, and the CoTI is sent directly with the mobile node's care-of-address as the packet source. The correspondent node, upon receiving the HoTI, will reply with a Home-Test (HoT) message sent to the home-address of the mobile node that contains a security token, called the Home Keygen Token (HoK), cryptographically generated based on the home-address of the mobile node using a private key. Similarly, the correspondent node, upon receiving the CoTI, will reply with a Care-of-Test (CoT) message sent to the care-of-address of the mobile node that contains a security token, called the Care-of Keygen Token (CoK), cryptographically generated based on the care-of-address of the mobile node using a private key. Once the mobile node receives both the HoT and CoT messages, it can send the correspondent node a BU containing an Authenticator. This Authenticator is a cryptographically generated checksum of the BU using a key that is a concatenation of the HoK and CoK. In this way, when the correspondent node receives the BU, it can independently calculate the checksum and check that the checksum is identical to that carried in the Authenticator. This verifies that the care-of-address and the home-address specified in the BU are indeed collocated.

In the following patent document 1, it was argued that the original return routability procedure is susceptible to man-in-the-middle attack. Following this argument, the patent document 1 proposes a variation of the return routability procedure where the home agent sets up a key exchange with the correspondent node, and passes the key information to the mobile node.

With the ever-increasing proliferation of wireless devices, it is foreseeable that a new class of mobility technology will emerge: network mobility, where a whole network of nodes changes its point of attachment in entirety. Extending the concept of mobility support for individual hosts to mobility support for a network of nodes, the objective of a network in motion solution is to provide a mechanism where nodes in a mobile network can be reached by their primary global addresses, no matter where on the Internet the mobile network is attached to. There exist a few prior attempts to solve the network in motion problem based on Mobile IP. One proposed solution for network in motion is the Mobile Router Support described in the following patent document 2. Here the mobile router controlling a mobile network performs routing of packets to and from the mobile network using some routing protocols when it is in its home domain. When the mobile router and its mobile network move to a foreign domain, the mobile router registers its care-of-address with its home agent. A tunnel is then set up between the mobile router and the home agent. The routing protocol used when the mobile router is at its home domain is again performed over the tunnel. This means that every packet going to the mobile network will be intercepted by the home agent and forwarded to the mobile router through the tunnel. The mobile router then forwards the packet to a host in its mobile network. When a node in its mobile network wishes to send a packet out of the network, the mobile router intercepts the packet and forwards the packet to the home agent through the tunnel. The home agent then sends the packet out to the intended recipient. Another solution disclosed in the following patent document 3 is largely similar, except it specifically stated support for IPv6 only. In the following patent document 4, a method of using a multicast address as the care-of-address of the mobile router is disclosed. This allows the mobile router to be reached using the same care-of-address even after it has moved to a new access network. The IETF is also currently developing solutions for network mobility as disclosed in the following non-patent document 2, known as NEMO Basic Support. In NEMO Basic Support, which is an extension of Mobile IPv6, it is specified that the mobile router when sending BU to its home agent, will specify the network prefixes that the nodes in the mobile network are using. These are specified using special options known as Network Prefix Options to be inserted into the BU. These allow the home agent to build a prefix-based routing table so that the home agent will forward any packets sent to destinations with these prefixes to the care-of-address of the mobile router.

Even when a mobile network node uses route optimization technique as described in Mobile IPv6 to communicate with a correspondent node, it will still suffer from sub-optimal routing because of the tunneling between the mobile router and its home agent. This is illustrated in FIG. 1. Here, the mobile node MN 120 is attached behind a mobile router MR 110 to access the global internet 100. MN 120 is communicating with correspondent node CN 140. Home agent HA 130 is the home agent for MR 110, and home agent HA 135 is the home agent for MN 120. Even when MN 120 and CN 140 have completed the return routability test and are using route optimization, packets sent between them still must follow the path 150, 151 and 152. This is because MR 110 and HA 130 maintain a bi-directional tunnel 151.

One way of achieving true route optimization is to include the mobile router information (called upper-level router information, usually, but not limited to, the address of the upper-level router) in the BU message sent to the correspondent node, as described in the following non-patent document 3 and the following non-patent document 4. In the non-patent document 3, this is achieved by using a reverse routing header attached to the data packet to allow upper level routers to record their respective addresses. A recipient (such as correspondent node) can then send packet directly to the mobile node by specifying a routing header that reverses the order of addresses found in a reverse routing header. In the non-patent document 4, this is achieved by the mobile node using a special option called access router option to convey the address of the upper level router. This way, the recipient can sent packet to the mobile node via the upper level router by using a reverse routing header.

Non-patent Document 1: Johnson, D. B., Perkins, C. E., and Arkko, J., "Mobility Support in IPv6", IETF RFC 3775, June 2004.

Non-patent Document 2: Devarapalli, V., et. al., "NEMO Basic Support Protocol", IETF Internet Draft: draft-ietf-nemo-basic-02.txt, December 2003.

Non-patent Document 3: Thubert, P. et. al., "IPv6 Reverse Routing Header and its Application to Mobile Networks", IETF Internet Draft: draft-thubert-nemo-reverse-routing-header-05.txt, June 2004.

Non-patent Document 4: Ng, C. W. et. al., "Securing Nested Tunnel Optimization with Access Router Option", IETF Internet Draft: draft-ng-nemo-access-router-option-01.txt, July 2004.

Patent document 1: Lee, Yooung-Ji, "Return Routability Method for Secure Communication", US Patent Application US20040179688A1, September 2004.

Patent document 2: Leung, K. K., "Mobile IP mobile router", U.S. Pat. No. 6,636,498, October 2003.

Patent document 3: Markki, O. E., et. al., "Mobile Router Support for IPv6", US Patent Application US20030117965A1, March 2002.

Patent document 4: Korus et. al., "Method and Apparatus for providing IP mobility for mobile network", US Patent Application US20030095523A1, May 2003.

However, both the non-patent document 3 and the non-patent document 4 do not specify how the correspondent node can verify that the upper level router information (i.e. the reverse routing header or the access router option) is authentic. Absence of such verification method will expose the correspondent node to various security vulnerabilities. For instance, an attacker may specify a victim's address in the upper-level router information in a BU message sent to a correspondent node. Without a way to verify if the upper-level router information is correct, the correspondent node may unknowingly send packets destined for the attacker to the victim's address as an intermediate location, thus flooding the victim's network with unwanted packets.

The patent document 1 describes that the original return routability procedure is susceptible to man-in-the-middle attack and discloses a method where the home agent sets up a key exchange with the correspondent node, and passes the key information to the mobile node. This method, however, increases home agent complexity and processing load.

DISCLOSURE OF THE INVENTION

It is thus an object of the present invention to overcome, or substantially ameliorate the disadvantages and shortcomings of the prior art. Specifically, it is an object of the present invention to provide the network managing method and network managing apparatus allowing any nodes receiving binding information containing upper-level router information (information on the upper-level router with respect to a predetermined node) to verify if the upper-level router information is valid.

To attain the above-mentioned object, the present invention provides a network managing method in a communication system, the communication system comprising a first communication node which is attached to a sub-network, a second communication node which is a correspondent node for the first communication node, and a router which is in the sub-network or an upper-level network of the sub-network, the network managing method for verifying if certain information is identification information of the router, comprising:

a step where the first communication node acquires the certain information;

a step where the first communication node generates a first message including the certain information, and sends the first information to the second communication node;

a step where the second communication node generates a second message to reply to the first message and sends the second message to the second communication node, the second message being set so as to be routed to the first communication node via an intermediate router based on the certain information included in the first message, the intermediate router being identified by the certain information;

a step where the intermediate router being identified by the certain information intercepts the second message; and a step where the intermediate router being identified by the certain information forwards the second message to the first communication node in case that the certain information is identification information of the intermediate router itself, and discards the second message in case that the certain information is not identification information of the intermediate router itself.

According to the above aspect, verification can be performed whether upper-level router information (information on the upper-level router with respect to a predetermined node) is valid or not.

To attain the above-mentioned object, the present invention provides a network managing apparatus in a communication system, the communication system comprising a first communication node which is attached to a sub-network, a second communication node which is a correspondent node for the first communication node, and a router which is in the sub-network or an upper-level network of the sub-network, the network managing apparatus for verifying if certain information is identification information of the router, the network managing apparatus being disposed in the first communication node and comprising:

message acquiring means for acquiring the certain information;

first message generating and sending means for generating a first message including the certain information, and sending the first information to the second communication node;

second message receiving means for receiving a second message for the second communication node to reply to the first message, the second message being set so as to be routed to the first communication node via an intermediate router based on the certain information included in the first message; and determining means for determining that the certain information is identification information of the router in case that the second message is received by the second message receiving means.

According to the above aspect, the first communication node can verify whether upper-level router information (information on the upper-level router with respect to a predetermined node) is valid.

To attain the above-mentioned object, the present invention provides a network managing apparatus in a communication system, the communication system comprising a first communication node which is attached to a sub-network, a second communication node which is a correspondent node for the first communication node, and a router which is in the sub-network or an upper-level network of the sub-network, the network managing apparatus for verifying if certain information is identification information of the router, the network managing apparatus being disposed in the first communication node and comprising:

message acquiring means for acquiring the certain information;

first message generating and sending means for generating a first message including the certain information, and sending the first information to the second communication node;

second message receiving means for receiving a second message for the second communication node to reply to the first message, the second message being set so as to be routed to the first communication node via an intermediate router based on the certain information included in the first message; and third message generating and sending means generating a third message to reply to the second message and sending the third message to the second communication node.

According to the above aspect, the second communication node can verify whether upper-level router information (information on the upper-level router with respect to a predetermined node) is valid.

To attain the above-mentioned object, the present invention provides a network managing apparatus in a communication system, the communication system comprising a first communication node which is attached to a sub-network, a second communication node which is a correspondent node for the first communication node, and a router which is in the sub-network or an upper-level network of the sub-network, the network managing apparatus for verifying if certain information is identification information of the router, the network managing apparatus being disposed in the second communication node and comprising:

first message receiving means for receiving a first message including certain information from the first communication node;

second message generating and sending means for generating a second message to reply to the first message, and sending the second message to the second communication node, the second message being set so as to be routed to the first communication node via an intermediate router based on the certain information included in the first message;

third message receiving means for receiving a third message for the first communication node to reply to the second message; and determining means for determining that the certain information is identification information of the router in case that the third message is received by the third message receiving means.

According to the above aspect, the second communication node can verify whether upper-level router information (information on the upper-level router with respect to a predetermined node) is valid.

The present invention comprising the foregoing construction has the advantage of allowing any nodes receiving binding information containing upper-level router information (information on the upper-level router with respect to a predetermined node) to verify if the upper-level router information is valid.

BEST MODE FOR CARRYING OUT THE INVENTION

Figure 1:
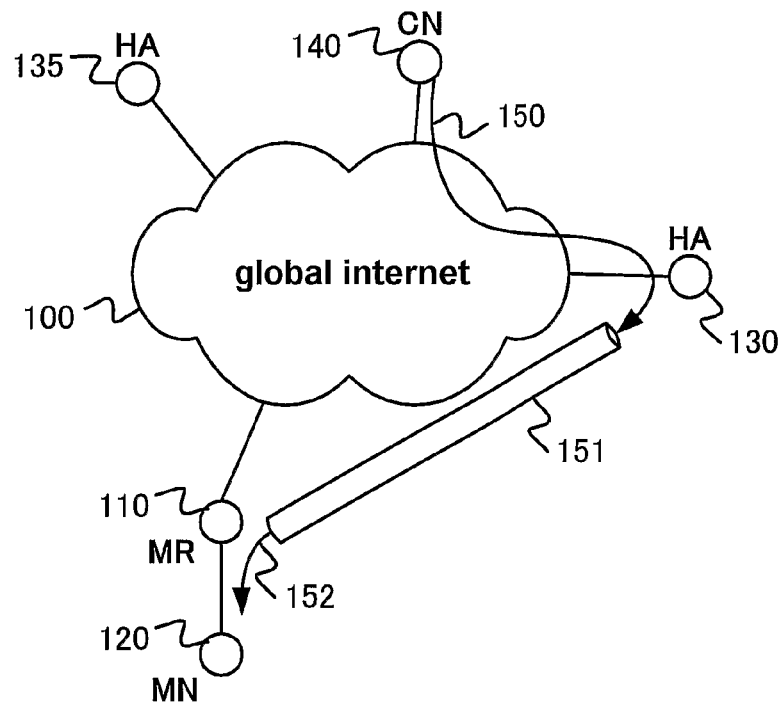
FIG. 1 is a diagram to explain packet transmission in the communication system of the prior art.
Figure 2:
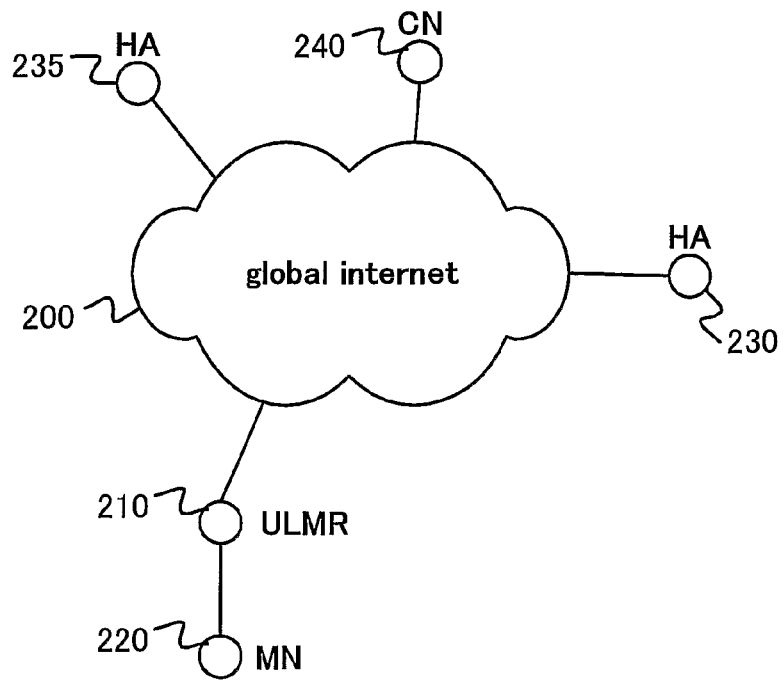
FIG. 2 is a diagram showing the first example of the communication system in the embodiment of the present invention.

Description will be given below on the preferred aspects of the present invention referring to the drawings. FIG. 2 is a diagram showing the first example of the communication system in the embodiment of the present invention. In FIG. 2, MN 220 is attached to an upper-level mobile router (ULMR) 210 from which it gains access to the global internet 200. HA 230 is the home agent for ULMR 210 and HA 235 is the home agent for MN 220. MN 220 is communicating with a correspondent node CN 240. Note that MN 220 can either be a mobile host or a mobile router. Throughout this specification, the term mobile node is to be understood as referring to a node that can be a mobile host using the Mobile IPv6 protocol, or a mobile router using the NEMO Basic Support protocol.

In non-optimized routing, packets sent from CN 240 to MN 220 will first be forwarded to HA 235, which then encapsulates the packet to MN 220. This encapsulated packet, however, will be forwarded to HA 230, which will further encapsulate the packet to ULMR 210. ULMR 210 then decapsulates the packet, and pass it to MN 220.

Route optimization can be used in two ways. Firstly, MN 220 can attempt to perform route optimization directly with correspondent node CN 240 by informing CN 240 the upper-level router information. Secondly, a partial route optimization (also known as nested tunnel optimization) can be performed between HA 235 and MN 220, so that packets need not go through the bi-directional tunnel between HA 230 and ULMR 210. This is done by sending the upper-level router information to HA 235.

There is a difference between these two cases. In the first case involving a correspondent node, there is no presumed security relationship between MN 220 and CN 240. Thus, return routability procedure need to be carried out. For this case, the present invention specifies an enhancement to the return routability procedure to allow CN 240 to verify the upper-level router information received from MN 220. In the second case involving a home agent, an existing security relationship can be assumed between MN 220 and HA 235, thus there is no need for return routability test. For this case, the present invention specifies an enhancement to the normal Mobile IPv6 binding update process to allow the HA 235 to verify that the upper-level router information is correct.

We first describe the case where the home agent verifies the validity of the upper-level mobile router information sent by a mobile node. Essentially, this is done by inserting a routing header (RH) to the binding acknowledgement (BA) message sent in response to the BU message. The routing header specifies a series of intermediate destinations that a packet must traverse.

When processing the routing header, the original source first sends the packet to the first intermediate destination. Every intermediate destination will update the routing header and send it to the next intermediate destination until the final destination is reached. In this case, the home agent specifies the upper-level mobile router (as specified in the upper-level router information) as the intermediate destination, and the mobile node as the final destination. Thus, if the upper-level router information is valid, the mobile node will be able to receive the BA message. This BA message is structured in such a way that the mobile node is forced to send a response back to home agent, so that the home agent knows that the mobile node has successfully received the BA message. This can also verify that the upper-level router information is correct.

One important point about routing header is that in order to avert reflection attack, most nodes deployed today will only continue to forward a packet with a routing header specifying the said node as an intermediate destination if and only if the path to the next destination is not the same as the path the packet has taken to reach the said node.

As an illustration, consider a node with two network interfaces, one egress and the other ingress. When the node receives a packet with a routing header specifying itself as an intermediate destination from its egress interface, it will only continue forwarding the packet if the next destination specified in the routing header lies in the path of its ingress interface. The node will discard the packet if the next destination lies in the same direction (i.e. egress interface) as how the packet is received. One implication of this form of processing routing header is that for a node with only one network interface, it will discard all packets with a routing header unless the node itself is the final destination specified in the routing header.

Figure 3:
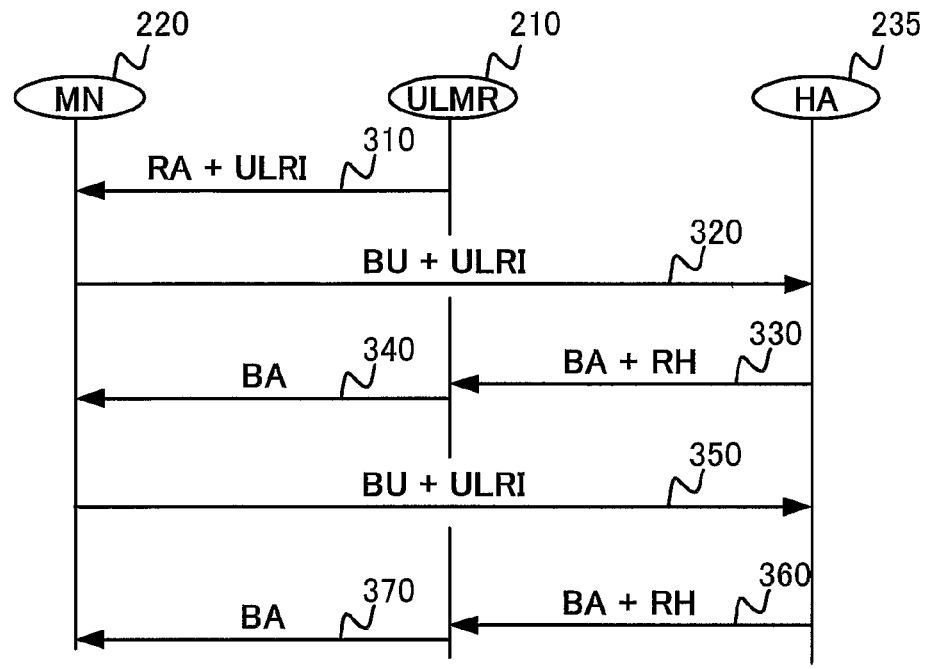
FIG. 3 is a diagram showing the first example of a message sequence in the communication system in the embodiment of the present invention.

FIG. 3 is a diagram showing the first example of a message sequence in the communication system in the embodiment of the present invention. In FIG. 3, a message sequence is illustrated of a preferred method for HA 235 to verify the upper-level router information sent by MN 220. First, MN 220 usually discovers information about its upper-level router, ULMR 210, by receiving router advertisement (RA) messages broadcasted by ULMR 210. These RA messages will contain information necessary for MN 220 to extract the upper-level router information (ULRI). The sending of the RA message is indicated by RA+ULRI 310 in FIG. 3. MN 220 then sends a BU message 320 to HA 235 containing the upper-level router information. To verify the validity of the upper-level router information, HA 235 sends MN 220 a BA message 330. In this BA message 330, HA 235 inserts a routing header into the BA message 330 so that the BA message 330 must be routed via the ULMR 210. In addition, the Lifetime field of the BA message 330 is set to a very small value, forcing MN 220 to resend the BU message in a very short time. When ULMR 210 receives the BA message 330, it updates the routing header and forwards the BA message 340 to MN 220. After the very short lifetime of the binding expires, MN 220 then sends a new BU message (BU+ULRI) 350 in order to renew the binding. When HA 235 receives the second BU message 350 sent within a pre-determined short period, it knows that the upper-level router information is valid, and accepts the BU message 350 HA 235 sets the binding with normal lifetime in the binding cache, and send back a BA message (BA+RH) 360. This BA message 360 is forwarded via ULMR 210. The operation of the binding update is completed by MN's reception of the BA message 370. It is not necessary that the response (BA message) to BU message 350 takes the path through ULMR 210, and it is possible that the BU message 350 sent in the second time is a usual BU message.

Figure 4:
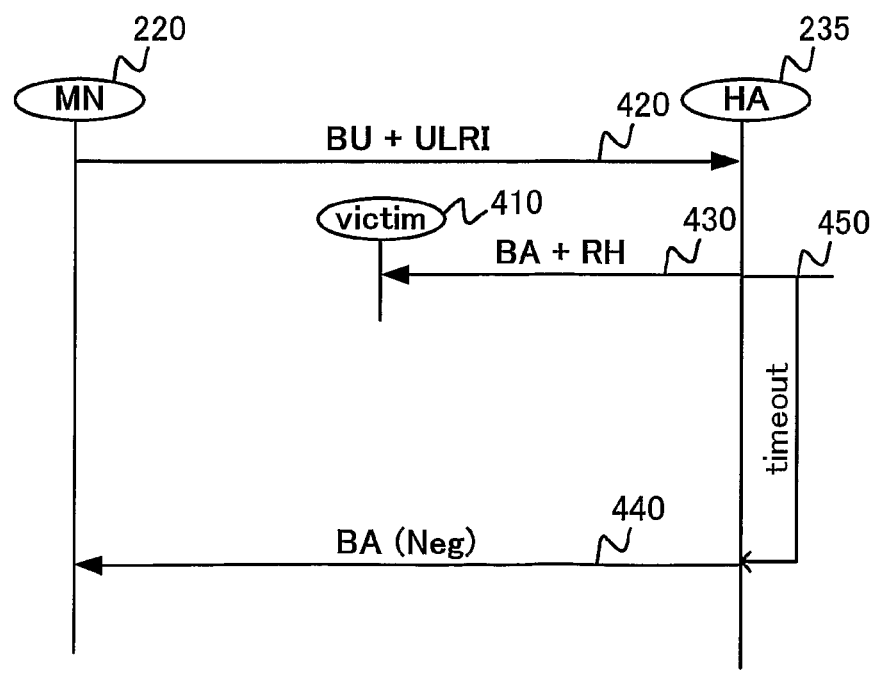
FIG. 4 is a diagram showing the second example of a message sequence in the communication system in the embodiment of the present invention.

FIG. 4 is a diagram showing the second example of a message sequence in the communication system in the embodiment of the present invention. FIG. 4 illustrates the case where the upper-level router information is invalid (such as incorrect information). For this purpose, we assume that the upper-level router information contains the address of a victim node 410. Again, upon receiving the BU message (BU+ULRI) 420 from MN 220, HA 235 sends MN 220 a BA message (BA+RH) 430 with a small Lifetime field. The BA message 430 contains a routing header that specifies the victim node 410 as the intermediate destination. Since the victim node 410 is not actually the upper-level mobile router of MN 220, it will simply discard the BA message 430. Thus, after a short time period (timeout value) 450, HA 235 having failed to receive a second BU message from MN 220, assumes that the upper-level router information to be invalid. Hence, HA 235 sends a negative BA message (BA(Neg)) 440 to inform MN 220 that the previous BU message 420 is rejected.

The timeout value 450 should be chosen such that it is sufficient for MN 220 to send the second BU message. This value should thus be no less than the sum of the time taken for the BA message to reach MN 220, the specified lifetime value in the BA message, and the time taken for the second BU message to be sent from MN 220.

It is possible that the victim node 410 may send an Internet Control Message Protocol (ICMP) error message to HA 235 upon receiving the BA message 430 with an invalid routing header. The reception of such an ICMP error can also indicate to HA 235 that the upper-level router information is invalid (such as incorrect information). So, HA 235 can immediately send the negative BA message 440 without having to wait for timeout.

Another preferred method of verification is for the home agent to insert an echo request option into the BA message. This forces the mobile node to response with an echo reply, thus informing the home agent that it has successfully received the BA message. This can also verify that the upper-level router information is correct.

Figure 5:
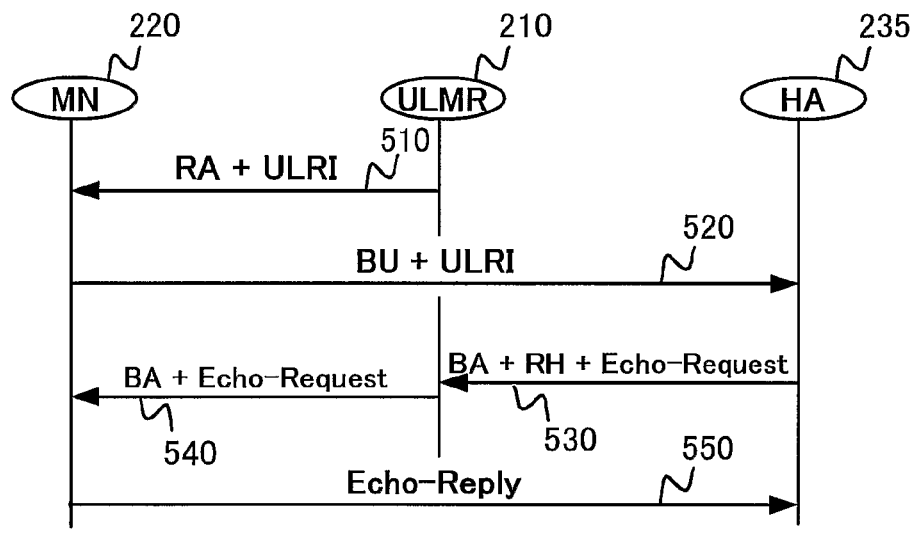
FIG. 5 is a diagram showing the third example of a message sequence in the communication system in the embodiment of the present invention.

FIG. 5 is a diagram showing the third example of a message sequence in the communication system in the embodiment of the present invention. In FIG. 5, the message sequence of the above-mentioned method is illustrated. MN 220 extracts the upper-level router information from the RA message (RA+ULRI) 510 received from the upper-level mobile router ULMR 210. MN 220 then sends a BU message (BU+ULRI) 520 to HA 235 containing the upper-level router information.

To verify the validity of the upper-level router information, HA 235 sends MN 220 a BA message 530. In this BA message 330, HA 235 inserts a routing header so that the BA message must be routed via the ULMR 210. In addition, an echo request option is inserted to the BA message. When ULMR 210 receives the BA message (BA+RH+Echo-Request) 530, it updates the routing header and forwards the BA message (BA+Echo-Request) 540 to MN 220. MN 220 having found an echo request option in the BA message, sends an echo reply 550 to HA 235. When HA 235 receives the echo reply 550, it knows that the upper-level router information is valid.

Figure 6:
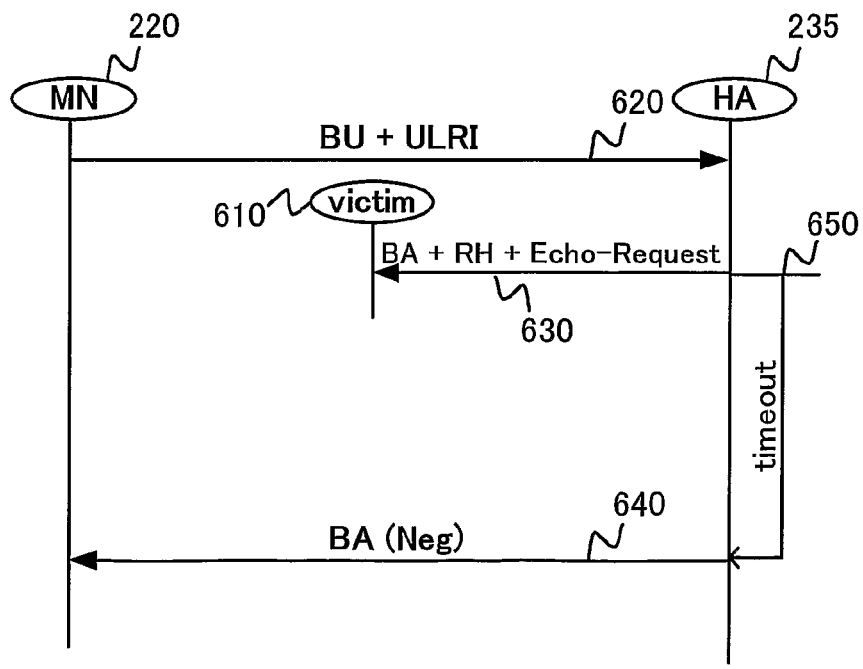
FIG. 6 is a diagram showing the fourth example of a message sequence in the communication system in the embodiment of the present invention.

FIG. 6 is a diagram showing the fourth example of a message sequence in the communication system in the embodiment of the present invention. FIG. 6 illustrates the case where the upper-level router information is invalid (such as incorrect information). For this purpose, we assume that the upper-level router information contains the address of a victim node 610. Again, upon receiving the BU message (BU+ULRI) 620 from MN 220, HA 235 sends MN 220 a BA message (BA+RH+Echo-Request) 630 with an echo request option. The BA message 630 contains a routing header that specifies the victim node 610 as the intermediate destination.

Since the victim node 610 is not actually the upper-level mobile router of MN 220, it will simply discard the BA message 630. Thus, after a short time period (timeout value) 650, HA 235 having failed to receive an echo reply from MN 220, assumes that the upper-level router information to be invalid. Hence, HA 235 sends a negative BA message (BA(Neg)) 640 to inform MN 220 that the previous BU message 620 is rejected. HA 235 having failed to receive an echo reply from MN 220 may simply inform that it has failed to verify ULRI.

The timeout value 650 should be chosen such that it is sufficient for MN 220 to send an echo reply. This value should thus be no less than the sum of the time taken for the BA message to reach MN 220 and the time taken for an echo reply to be sent from MN 220.

It is possible that the victim node 610 may send an ICMP error message to HA 235 upon receiving the BA message 630 with an invalid routing header. The reception of such an ICMP error can also indicate to HA 235 that the upper-level router information is invalid (such as incorrect information). So, HA 235 can immediately send the negative BA message 640 without having to wait for timeout.

Preferably, the echo reply message must duplicate some portion of the BA message containing the echo request option. This will prevent the attacker from sending a false echo reply to trick the home agent into accepting the upper-level router information. Alternatively, it is not unreasonable to assume a security relationship to exist between the mobile node and the home agent. Thus, the echo reply can preferably be protected using this security relationship, so that its authenticity can be verified by the home agent.

It should be noted that under Mobile IPv6 (and NEMO Basic Support), BU messages and BA messages sent between a mobile node and its home agent should be protected by a security relationship assumed to exist between the mobile node and the home agent. This applies for BU messages and BA messages specified in FIGS. 2 to 6 as well.

When the mobile node needs to perform route optimization with a correspondent node, the verification of upper-level router information get a little more complex since one cannot assume a pre-existing security relationship between the mobile node and correspondent node. To allow the verification of upper-level router information, the present invention enhances the original return routability procedure to check for routability via the upper-level mobile router as well.

Figure 7:
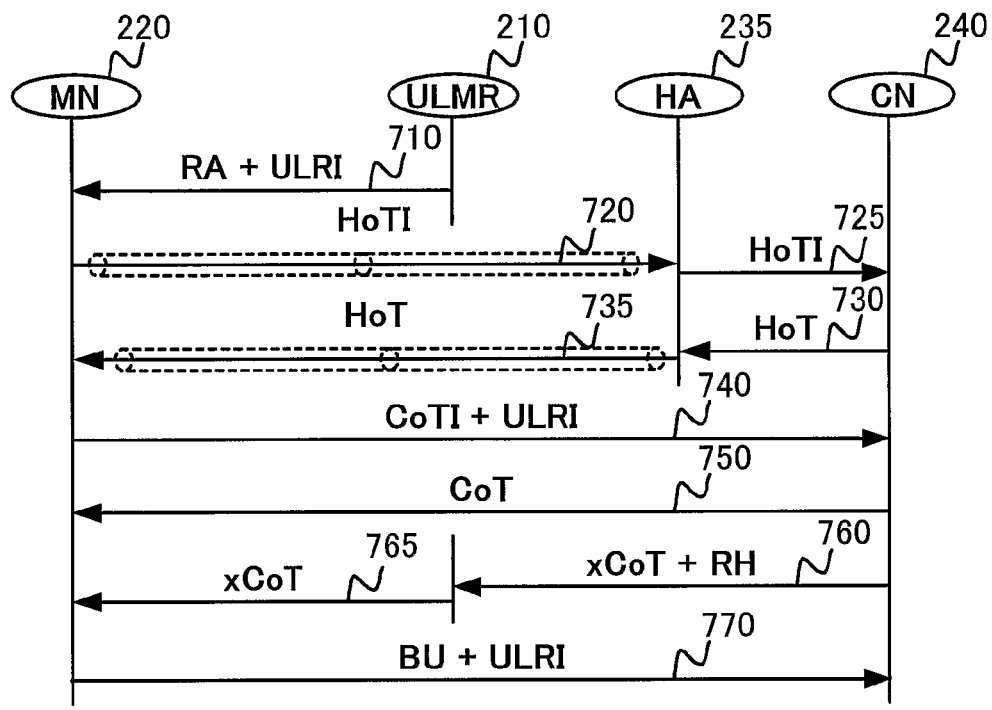
FIG. 7 is a diagram showing the fifth example of a message sequence in the communication system in the embodiment of the present invention.

FIG. 7 is a diagram showing the fifth example of a message sequence in the communication system in the embodiment of the present invention. In FIG. 7, the message sequence chart is illustrated of the enhanced return routability procedure by the present invention between MN 220 and the correspondent node 240. As before, MN 220 extracts the upper-level router information from the RA message (RA+ULRI) 710 received from its upper-level mobile router ULMR 210. MN 220 then proceeds with the sending of a Home Test Init (HoTI) message 720 and a Care-of Test Init (CoTI) message 740.

The HoTI message 720 is sent using the home-address of MN 220 as the source address, and is thus forwarded via HA 235 through the bi-directional tunnel established between MN 220 and HA 235. Content of this HoTI message 720 (HoTI message 725 after the tunnel) is exactly the same as in the original return routability procedure. The CoTI message 740 is sent using the care-of address of MN 220 as the source address. The content of CoTI message 740 is similar to that described in the original return routability procedure, with the additional inclusion of upper-level router information.

When CN 240 receives the HoTI message 725, it responses with HoT message 730. Contents of this HoT message 730 is exactly the same as the original return routability procedure, specifically, it contains a home keygen token (HoK) cryptographically generated based on the home-address of MN 220. HoT message 730 is sent to the home-address of MN 220, and is thus intercepted by HA 235 and tunneled through 735. When CN 240 receives the CoTI message 740 with extra upper-level router information, it sends back a normal CoT message 750 and an extra CoT (xCoT+RH) message 760.

The normal CoT message 750 contains the same contents as a CoT message in the original return routability procedure. Specifically, it contains a care-of keygen token (CoK) that is cryptographically generated based on the care-of-address of MN 220. The xCoT message 760 contains an extra care-of keygen token (xCoK) that is cryptographically generated based on the upper-level router information specified in the CoTI message 740. The CoT message 750 is sent directly to the care-of address of MN 220, and xCoT message 760 is sent to MN 220 using a routing header that will route the packet through the upper-level router(s) specified in the CoTI message 740. In the example illustrated in FIG. 7, ULMR 210 will receive this xCoT message 760, process the routing header, and forward the processed xCoT message 765 to the final destination (MN 220).

Once MN 220 receives the xCoT message 765, it can send the BU message (BU+ULRI) 770 to CN 240 to complete the return routability procedure. In BU message 770, MN 220 will include the upper-level router information, and a cryptographic checksum generated by concatenating the HoK, CoK and xCoK tokens extracted from HoT message 735, CoT message 750, and xCoT message 765. CN 240 can independently generate the CoK, HoK and xCoK tokens based on the information from BU message 770, and verify if the checksum contained in BU message 770 tallies. This verifies the validity of the upper-level router information, in addition to the co-location of care-of-address and home-address.

Figure 8:
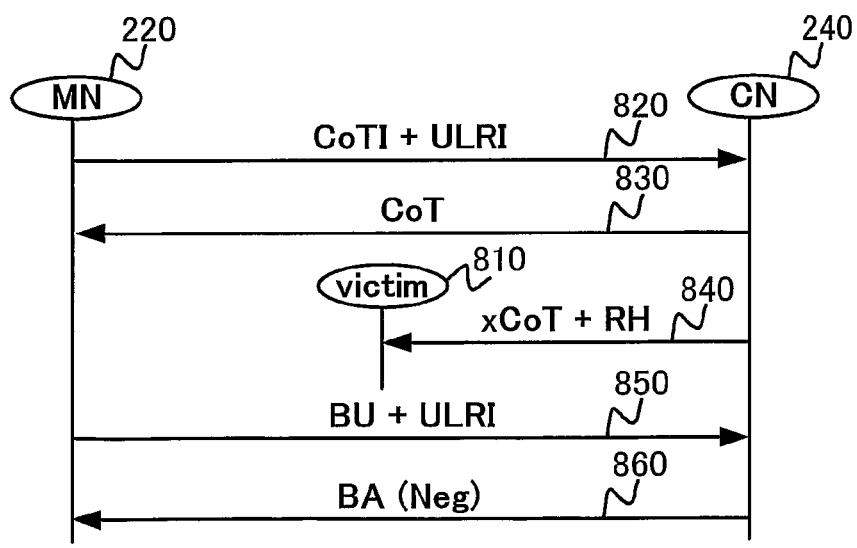
FIG. 8 is a diagram showing the sixth example of a message sequence in the communication system in the embodiment of the present invention.

FIG. 8 is a diagram showing the sixth example of a message sequence in the communication system in the embodiment of the present invention. FIG. 8 illustrates the case where the upper-level router information is invalid (such as incorrect information). For simplicity, FIG. 8 does not show the sending of HoTI and HoT messages.

As described, CN 240, after receiving CoTI message 820, will respond with CoT message 830 and xCoT message 840. CoT message 830 contains exactly the same contents as the normal return routability procedure. xCoT message 840 contains the same contents as CoT message, except that the xCoK token is generated based on the upper-level router information, and a routing header s appended to the message so that xCoT message 840 is routed through the upper-level routers specified in the upper-level router information. Since the upper-level router information specified in CoTI message 820 is invalid (such as incorrect information), the xCoT message (CoT+RH) 840 will be routed to a victim node 810. Victim node 810 will discard the message 840, thus MN 220 will not receive any xCoT message. If MN 220 proceeds to send the BU message 850 with upper level router information, CN 240 will detect that the checksum is invalid. This is because MN 220 generates the checksum based only on the CoK and HoK tokens it has received, whereas CN 240 will generate the checksum based on HoK, CoK and xCoK tokens that it has independently generated. Thus, CN 240 will reject the BU message 850 with a negative BA message (BA(Neg)) 860.

Figure 9:
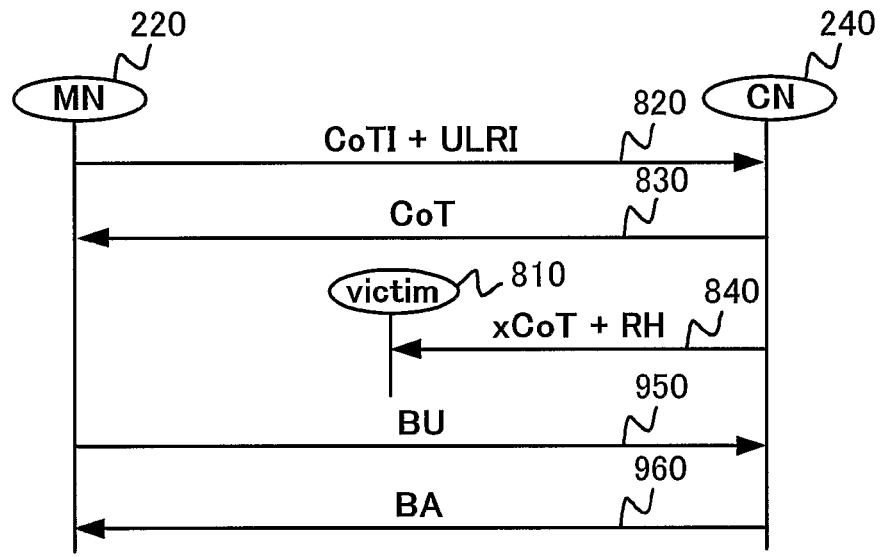
FIG. 9 is a diagram showing the seventh example of a message sequence in the communication system in the embodiment of the present invention.

One might have noticed that the sending of CoT message and xCoT message is some form of redundancy, as a xCoT message would suffice to serve purpose of verifying the validity of care-of-address and upper-level router information, and as a CoT message can be used to verify the validity of a care-of address. The reason why both are sent is allow MN 220 to fall back to normal binding update in case that the upper-level router information is invalid (such as incorrect information). Referring to FIG. 9 the above case is described.

FIG. 9 is a diagram showing the seventh example of a message sequence in the communication system in the embodiment of the present invention. In FIG. 9, it is assumed that the upper-level router information inserted into CoTI message 820 by MN 220 is invalid (such as incorrect information). As described in FIG. 8, CN 240 responds to the CoTI message 820 with a CoT message 830 and a xCoT message 840 together with a routing header. MN 220 successfully receives CoT message 830, but since the upper-level router information is invalid, it cannot receive xCoT message 840, which is discarded by the victim node 810. In this case, MN 220 can understand that the care-of address is valid, but the upper-level router information may be invalid, and fall back to sending a normal BU message 950 without any upper-level router information. For this case, the checksum of BU message 950 is cryptographically generated using the concatenation of HoK and CoK tokens extracted from HoT and CoT messages respectively. When CN 240 receives this BU message 950, since there is no upper-level router information, CN 240 generates the checksum based on care-of-address and home-address of MN 220 only. This results in the same checksum being generated, and thus CN 240 will accept the BU message 950 as valid, and respond with an affirmative BA message 960.

Figure 10:
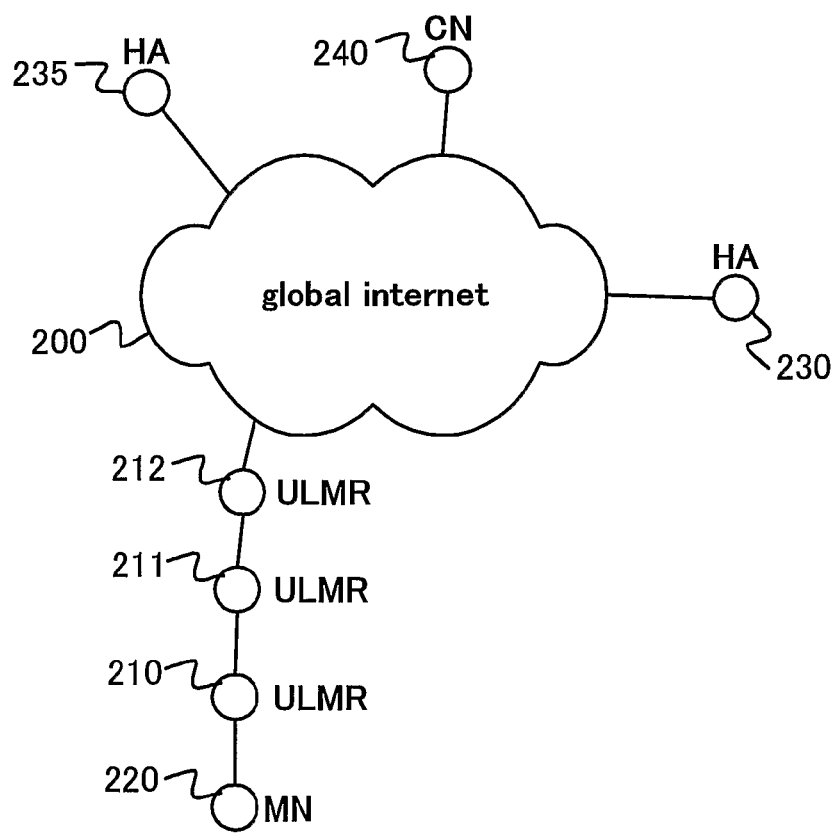
FIG. 10 is a diagram showing the second example of the communication system in the embodiment of the present invention.

In the above examples, the upper-level router information is shown to consist of only the address of one upper-level router. It is possible for this upper-level router information to contain information of routers at multiple levels. This is illustrated in FIG. 10. FIG. 10 is a diagram showing the second example of the communication system in the embodiment of the present invention. In FIG. 10, MN 220 is behind a chain of three mobile routers, ULMR 210, ULMR 211, and ULMR 212. In this case, the upper-level router information will contain the address information of all three mobile routers. When MN 220 sends binding update messages to its HA 235 or correspondent node CN 240, it will include the upper-level router information to inform the recipients that MN 220 can be reached via ULMR 212, ULMR 211 and ULMR 210.

When HA 235 needs to check the validity of this upper-level router information, it will attach a routing header to the BA message as described previously. The routing header will be constructed based on the upper-level router information received, so that the BA message will first be routed to ULMR 212, then to ULMR 211, then to ULMR 210, and finally to MN 220. This is done be specifying in the routing header that ULMR 212 as the first intermediate destination, ULMR 211 as the second intermediate destination, ULMR 210 as the third intermediate destination, and MN 220 as the final destination.

Similarly, when CN 240 needs to check the validity of the upper-level router information in a CoTI message received from MN 220, it will use the upper-level router information to construct a routing header to be added to a xCoT message sent to MN 220. This routing header will specify ULMR 211 as the second intermediate destination, ULMR 210 as the third intermediate destination, and MN 220 as the final destination.

The above descriptions have completely defined the improved return routability procedure of the present invention. Following this, exemplary implementation of the invention is disclosed.

Figure 11:
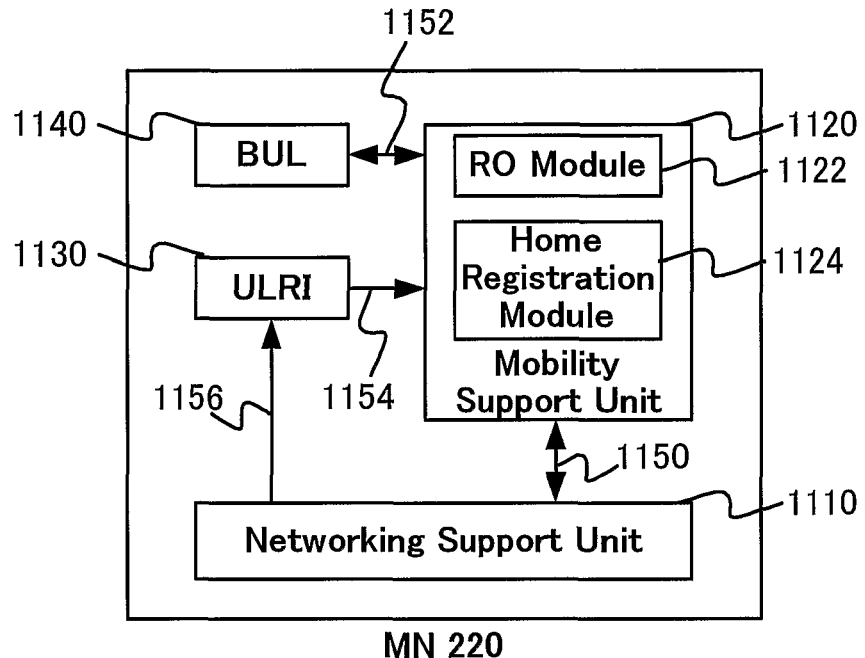
FIG. 11 is a block diagram showing an example of a functional architecture of a mobile node in the embodiment of the present invention.

FIG. 11 is a block diagram showing an example of a functional architecture of a mobile node in the embodiment of the present invention. In FIG. 11, a preferred functional architecture of MN 220 is shown. MN 220 comprises a networking support unit 1110 consisting of a set of networking protocols. This includes all protocols, software and hardware necessary for provisioning networking capabilities to MN 220. MN 220 also comprises a mobility support unit 1120. This includes all software necessary to support mobile protocols such as Mobile IP or NEMO Basic Support.

Within the mobility support unit 1120, there is a route optimization (RO) module 1122 and a home registration module 1124. The RO module 1122 performs route optimization with a correspondent node, and the home registration module 1124 performs home registration, such as sending binding update messages to the home agent. There are two memory stores required: a binding update list (BUL) 1140 to store the correspondent nodes that have received a binding update from a mobile node 220, and an upper-level router information (ULRI) store 1130 to store the current ULRI received from upper-level router. The paths 1150, 1152, 1154 and 1156 show the data paths between these functional blocks.

When the networking support unit 1110 receives any messages that are related to mobility signaling (such as BA message, CoT message, or xCoT message), it will pass these messages to the mobility support unit 1120 via the data path 1150 for further processing. When the networking support unit 1110 receives an advertisement containing upper-level router information from an upper-level router, it will update the information stored in ULRI store 1130 via the data path 1156.

The home registration module 1124 will send BU messages to the home agent based on the information stored in the ULRI store 1130. It is also responsible for sending an echo response back to the home agent if it has received a BA message containing an Echo Request.

The RO module 1122 is responsible for initiating the return routability procedure with correspondent nodes. It will send the HoTI and CoTI messages, where the CoTI will contain ULRI based on the information stored in the ULRI store 1130 via the data path 1154. The RO module 1122 is also responsible for collecting the HoK, CoK and xCoK tokens from the correspondent node. For this, the RO module 1122 will make use of the BUL 1140 via the data path 1152 to store these tokens. Once a BU message is successful sent to the correspondent node, it will also update the BUL 1140 to indicate that route optimization is now possible with the correspondent node.

Figure 12:
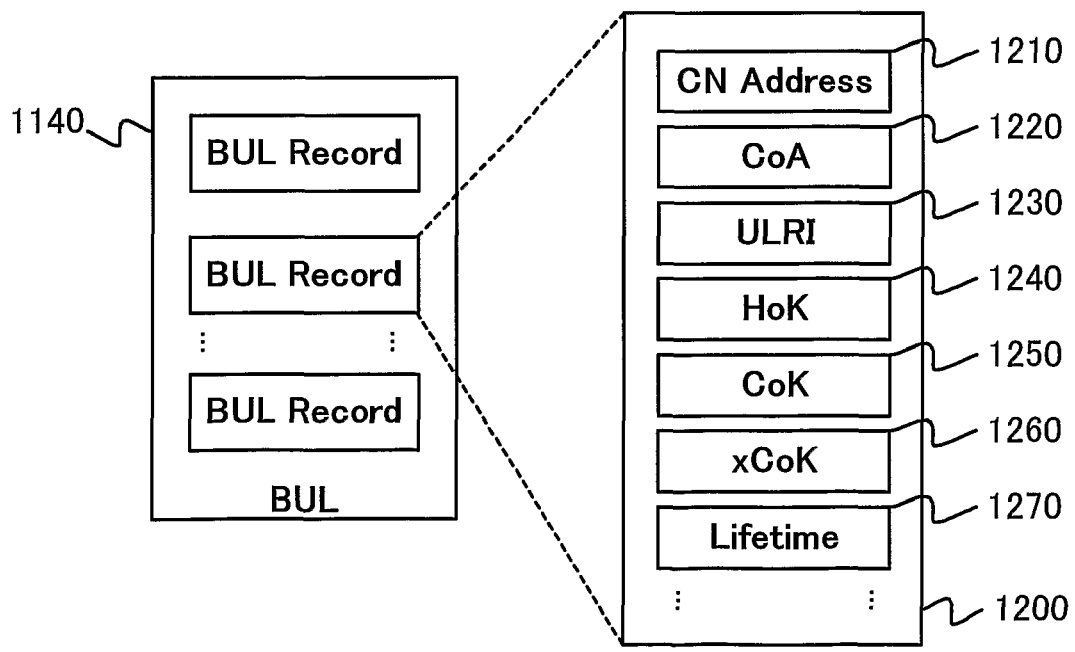
FIG. 12 is a diagram showing an example of contents of the binding update list in the embodiment of the invention.

FIG. 12 is a diagram showing an example of contents of the binding update list in the embodiment of the invention. In FIG. 12, the contents of the BUL 1140 are shown. BUL 1140 contains one or more BUL records 1200. In each BUL record 1200, there is a series of fields to store information associated with a route optimization session with a specific correspondent node.

Preferably, this BUL record 1200 will consist of the CN address field 1210, which stores the address of the correspondent node; the CoA field 1220, which stores the care-of address of MN 220 that is sent to the correspondent node; the ULRI field 1230, which stores the ULRI information that is sent to the correspondent node; the HoK field 1240, which stores the cryptographic keygen token (HoK) retrieved from a HoT message sent by the correspondent node; the CoK field 1250, which stores the cryptographic keygen token (CoK) retrieved from a CoT message sent by the correspondent node; the xCoK field 1260, which stores the cryptographic keygen token (xCoK) retrieved from a xCoT message sent by the correspondent node; and the Lifetime field 1270, which indicates when the binding will expire.

Figure 13:
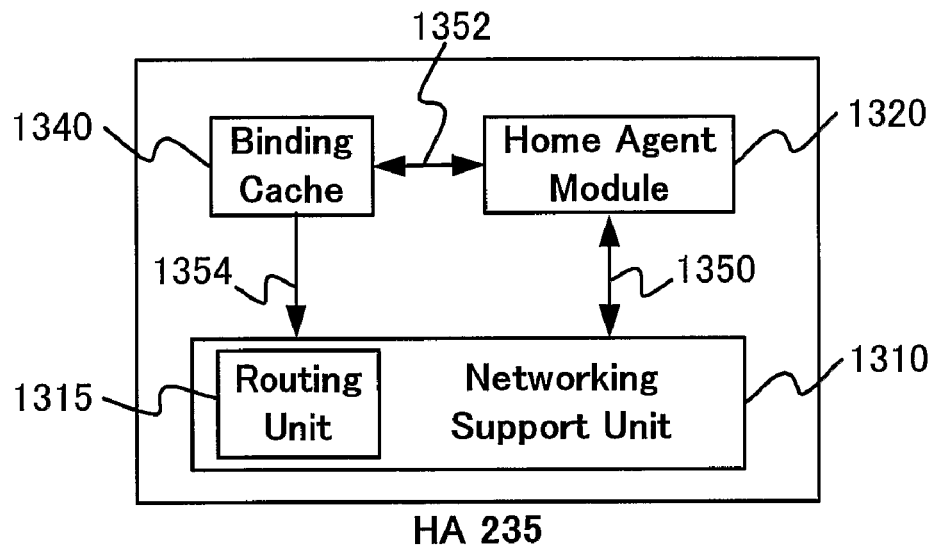
FIG. 13 is a block diagram showing an example of a functional architecture of a home agent in the embodiment of the present invention.

FIG. 13 is a block diagram showing an example of a functional architecture of a home agent in the embodiment of the present invention. In FIG. 13, a preferred architecture of the home agent 235 is shown. HA 235 comprises the networking support unit 1310 consisting of a set of networking protocols. This includes all protocols, software and hardware necessary for provisioning networking capabilities to HA 235. HA 235 also comprises a routing unit 1315 responsible for making routing decisions when forwarding packets, and a home agent module 1320 that provides home agent functionalities. The home agent module 1320 uses a binding cache store 1340 to store all the bindings received from mobile nodes. Data and signals are passed between these functional blocks via the paths 1350, 1352, and 1354.

When the networking support unit 1310 receives any BU message, it passes the message via the data path 1350 to the home agent module 1320 for further processing. The home agent module 1320 is responsible for processing these BU messages, and updating the binding cache 1340 via the data path 1352 according to these BU messages. If the BU message contains upper-level router information, the home agent module 1320 is also responsible to check the validity of the ULRI by performing any procedure disclosed in this specification.

When the routing unit 1315 is making forwarding decision for a packet, it will need to consult the binding cache 1340 via the data path 1354 to check if there is an address binding for the destination. If there is, the routing unit 1315 will have to tunnel the packet to the care-of address specified in the binding cache entry. In addition, if the binding cache entry also indicates that an associated ULRI is available, the routing unit 1315 will also have to construct the routing header based on the upper-level router information to be appended to the packet.

Figure 14:
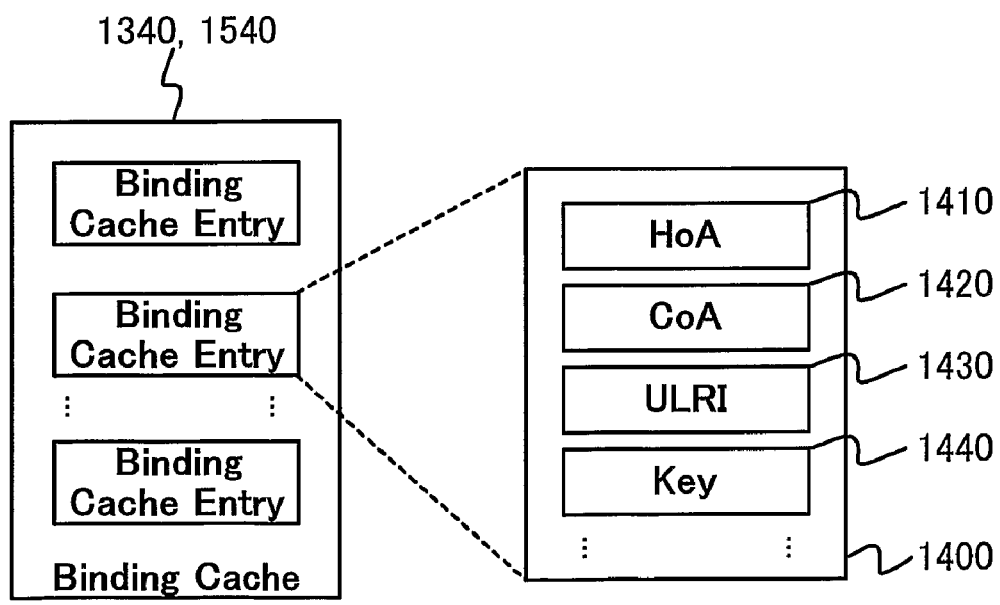
FIG. 14 is a diagram showing an example of contents of the binding cache in the embodiment of the invention.

FIG. 14 is a diagram showing an example of contents of the binding cache in the embodiment of the invention. In FIG. 14, the preferred contents of a binding cache 1340 of HA 235 or a binding cache 1540 of the correspondent node CN 240 (see FIG. 15 described later). The binding cache 1340 and 1540 contains a list of binding cache entries 1400. Each binding cache entry 1400 will preferably include the following fields: a HoA field 1410 containing the home-address of the mobile node; a CoA field 1420 storing the current care-of-address of the mobile node; a ULRI field 1430 storing the upper-level router information of the mobile node; and a key field 1440 storing a security key for the protection of binding update messages.

Figure 15:
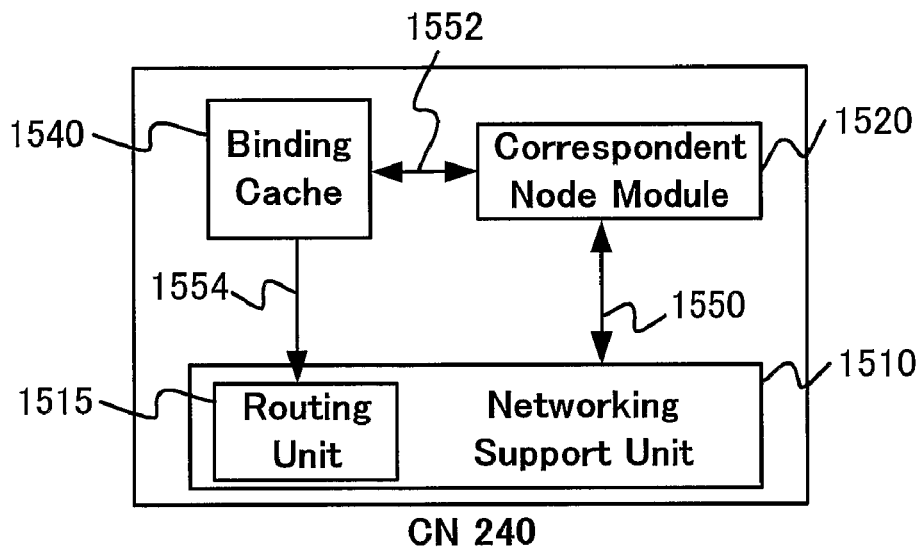
FIG. 15 is a block diagram showing an example of a functional architecture of a correspondent node in the embodiment of the present invention.

FIG. 15 is a block diagram showing an example of a functional architecture of a correspondent node in the embodiment of the present invention. In FIG. 15, a preferred architecture of the correspondent node CN 240 is shown. The correspondent node CN 240 comprises a networking support unit 1510 consisting of a set of networking protocols. This includes all protocols, software and hardware necessary for provisioning networking capabilities to the correspondent node CN 240. The functional architecture also comprises a routing unit 1515 responsible for making routing decisions when forwarding packets, and a correspondent node module 1520 that provides route optimization functionalities. The correspondent node module 1520 uses a binding cache store 1540 to store all the bindings received from mobile nodes. For example, the binding cache 1540 includes contents described earlier in FIG. 14. Data and signals are passed between these functional blocks via the paths 1550, 1552, and 1554.

When the networking support unit 1510 receives any mobility related message (such as the HoTI message, CoTI message, or BU message), it passes the message via the data path 1550 to the correspondent node module 1520 for further processing. The correspondent node module 1520 is responsible for processing these mobility messages, and updating the binding cache 1540 via the data path 1552 according to a received BU message. If the BU or CoTI message contains upper-level router information, the correspondent node module 1520 is also responsible to check the validity of the ULRI by performing any procedure disclosed in this specification.

When the routing unit 1515 is making forwarding decision for a packet, it will need to consult the binding cache 1540 via the data path 1554 to check if there is an address binding for the destination. If there is, the routing unit 1515 will have to tunnel the packet to the care-of address specified in the binding cache entry. In addition, if the binding cache entry also indicates that an associated upper-level router information is available, the routing unit 1515 will also have to construct the routing header based on the upper-level router information to be appended to the packet.

We now describe specifically preferable implementation of the improved return routability procedure of the present invention disclosed in this specification. It should be appreciated by those skilled in the art that the following implementation described is just an example, and the present invention is not limited to the following descriptions. Hereinafter, descriptions are provided referring the system deployment shown in FIG. 2.

In the system deployment shown in FIG. 2, when MN 220 determines that it wishes to perform route optimization with the correspondent node CN 240, it initiates the improved return routability procedure by sending the HoTI and CoTI messages to CN 240. Sending of the HoTI message is exactly the same as the original return routability procedure. Sending of the CoTI message is also largely similar to that in the original return routability procedure, except that MN 220 inserts the upper-level router information into the CoTI message. For this example, we assume that the upper-level router information contains the address of ULMR 210. The CoTI message should also contain a Care-of-Init Cookie value that is used by MN 220 and referred by CN 240.

When CN 240 receives the HoTI message, and decides to accept route optimization with MN 220, it responds with a HoT message. Preparation of the HoT message is exactly the same as that specified in Mobile IPv6.

When CN 240 receives the CoTI message, and decides to accept route optimization with MN 220, it responds with a CoT message and an xCoT message. Preparation of the CoT message is exactly the same as that specified in Mobile IPv6. In preparation of the xCoT message, CN 240 first selects a nonce to generate the keygen token (the extended Care-of Keygen Token, xCoK). The selected nonce should be identifiable by a 16-bits nonce index, and should be the same as that used for the CoT message. The extended Care-of Keygen Token, xCoK, is then generated by:

xCoK:=First(64,HMAC_SHA1(Kcn,(care-of-address|ULRI|nonce|0x02)));

where 'First(L,m)' is a function to truncate the message m leaving the leftmost L bits, 'HMAC_SHA1(K,m)' is the hash result of taking the HMAC-SHA1 hash function on the message m using the cryptographic key K, 'Kcn' is a secret key of the correspondent node, 'ULRI' contains the upper-level router information (only the address of ULMR 210 in this case), and '|' denotes concatenation of bit streams. The last value in the hush function '0x02' is an octet value used to identify xCoK from the other keygen Tokens.

The xCoK and the nonce index are then included in a xCoT message to be returned to MN 220, including the Care-of Init Cookie copied from the CoTI message. When sending the xCoT message, CN 240 inserts a routing header to the xCoT message, so that it will be routed first to ULMR 210, before reaching MN 220.

After sending the HoTI and CoTI messages, MN 220 must start intercepting the HoT, CoT, and xCoT messages. Once MN 220 has received the HoT message, CoT message, and xCoT messages, it can proceed to complete the return routability procedure by sending the BU message.

There are several sanity checks that MN 220 can perform when receiving the HoT, CoT, and xCoT messages as follows. Firstly, MN 220 can verify that the Home Init Cookie in the HoT message and Care-of Init Cookie in the CoT and xCoT messages are the same as those it has sent in the HoTI and CoTI messages. Secondly, it can check that the xCoT message specifies the same Care-of Nonce Index as that specified in the CoT message.

To complete the return routability procedure, MN 220 will have to send the BU message to CN 240. In the BU message, MN 220 should include the nonce indices in the Nonce Indices option, and also the upper-level router information. Furthermore, MN 220 should include a cryptographic checksum in the Authenticator field of a Binding Authorization Data option. To generate the checksum, the MN 220 must first obtain the binding management key, Kbm, given by:

Kbm:=SHA1(HoK|CoK|xCoK);

where 'SHA1(m)' is the result of applying the Secure Hash Algorithm on the message m, 'HoK' is the HoK Token from the HoT message, 'CoK' is the CoK Token from the CoT message, and 'xCoK' is the xCoK Token from the xCoT message.

This gives the Kbm as a 20 octets (160 bits) long value. Kbm is used by both MN 220 and CN 240 to generate the Authenticator value. For the Binding Update message, the Authenticator value is given by:

Authenticator:=First(96,HMAC_SHA1(Kbm, (CoA|correspondent|BU));

where 'CoA' is the care-of address of MN 220, 'correspondent' is the address of CN 240, and 'BU' is the entire Binding Update message except the Authenticator field itself.

When generating the Authenticator value, the Checksum field of the Mobility Header is first initialized as zero. Before sending the BU message, the Binding Authorization Data option is appended as the last option, and the Checksum is finally calculated, including the Authenticator field in the calculation. It must again be noted that CN 240 need not maintain any state information before the receipt of the BU message. Using information contained in the BU message, it is sufficient for the correspondent node to generate the HoK, CoK, and xCoK to derive the binding management key independently and verify the Authenticator value.

When MN 220 fails to receive a HoT or CoT message after sending the HoTI and CoTI message, it must not proceed with sending of BU message. If a pre-determined time period has elapsed before a HoT or CoT message, MN 220 may assume that some packets are lost, and re-initiate the return routability procedure. MN 220 may give up the return routability procedure after one or more consecutive failed attempts.

If MN 220 has failed to receive any xCoK message, MN 220 may choose to proceed with sending a normal BU message (without any upper-level router information) or to re-initiate the return routability procedure. If it chooses to re-initiate the return routability procedure, it may give up the return routability procedure after one or more consecutive failed attempts.

If CN 240 does not support the original return routability procedure, it will respond to the HoTI and CoTI messages with an Internet Control Message Protocol (ICMP) parameter problem code 1. MN 220 should take such messages as indication of the correspondent node not supporting the return routability procedure.

On the other hand, if CN 240 supports the original return routability procedure, but not the improved one defined in the present invention, it will silently ignore the upper-level router information in the CoTI message. This will result in MN 220 unable to receive any xCoT message.

Figure 16:
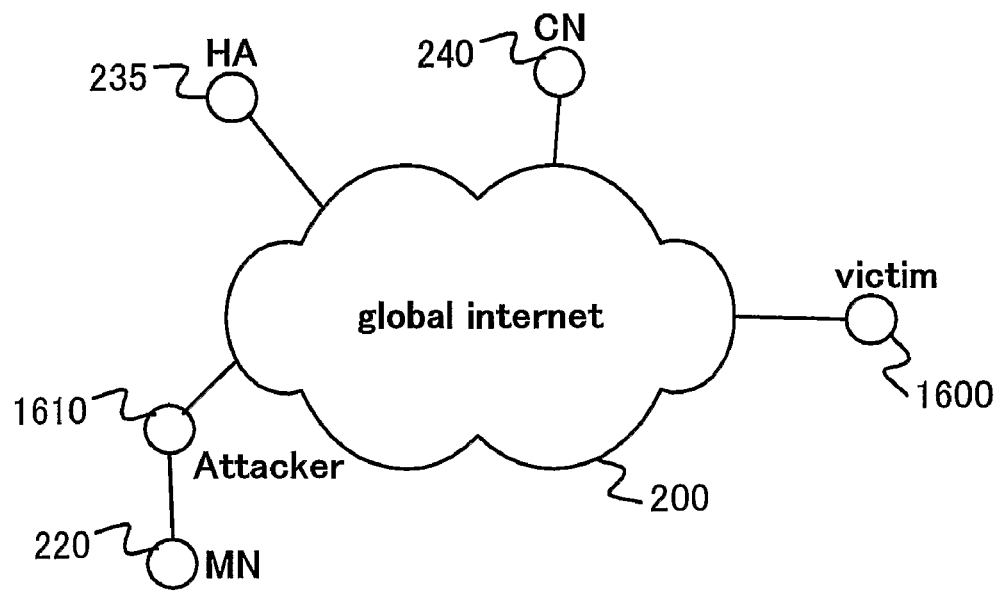
FIG. 16 is a diagram showing the third example of the communication system in the embodiment of the present invention.

Now, we describe some methods where the present invention could be used to detect security threats as well as to improve security. FIG. 16 is a diagram showing the third example of the communication system in the embodiment of the present invention. In FIG. 16, one type of flooding attack is shown in which the original return routability procedure could not prevent. Here, MN 220 is attached to the attacker 1610.

Attacker 1610, to launch a flooding attack against victim 1600, inserts false upper-level router information (including the address of victim 1600) to the router advertisement messages which attacker 1610 sends to MN 220 attached to attacker 1610 itself, such that MN 220 thinks that its upper-level router has the address of victim 1600. Thus, MN 220 will send a BU message to its HA 235 and correspondent node CN 240 that it is attached to victim 1600. Because HA 235 will send a BA message directly to the care-of-address of MN 220, both MN 220 and HA 235 will not know that the upper-level router information is wrong. Thus from then on, HA 235 will forward all packets destined for MN 220 to victim 1600 as an intermediate destination, thus flooding victim 1600 with unwanted packets.

Similarly, because the CoT message and HoT message are sent to the care-of-address and home-address of MN 220 respectively, both MN 220 and CN 240 cannot detect that the ULRI is wrong. Thus from then on, CN 240 will forward all packets destined for MN 220 to victim 1600 as an intermediate destination, thus flooding victim 1600 with unwanted packets.

With the present invention, HA 235 will send a BA message with routing header specifying victim 1600 as an intermediate destination, and MN 220 as a final destination. So, if MN 220 is not attached to victim 1600, victim 1600 will not further forward the packet. Thus, MN 220 will not be able to receive the BA message, and hence the binding update will expire after a very short time.

Similarly, CN 240 will send a xCoT message with a routing header specifying victim 1600 as an intermediate destination, and MN 220 as a final destination. So, if MN 220 is not attached to victim 1600, victim 1600 will not further forward the packet. Thus, MN 220 will not be able to receive the xCoT message, and hence could not extract the xCoK token to complete the return routability procedure.

Figure 17:
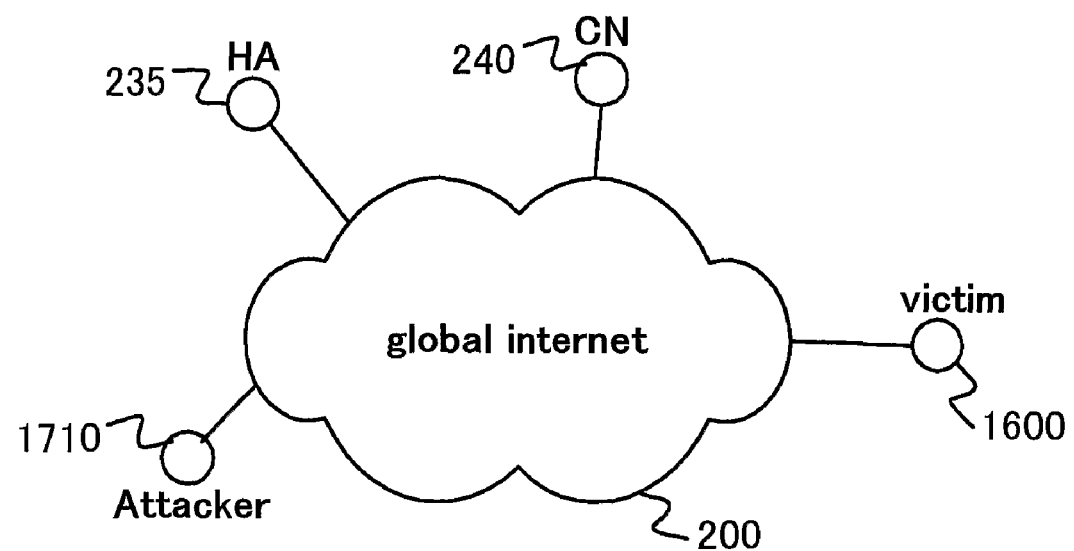
FIG. 17 is a diagram showing the fourth example of the communication system in the embodiment of the present invention.

FIG. 17 is a diagram showing the fourth example of the communication system in the embodiment of the present invention. In FIG. 17, In FIG. 16, another type of flooding attack is shown in which the original return routability procedure could not prevent. Here, attacker 1710 itself is a mobile node.

In order to launch a flooding attack against victim 1600, attacker 1710 inserts false upper-level router information (the address of victim 1600) to BU messages sent to its HA 235 and/or correspondent node CN 240. Because HA 235 will send BA message directly to the care-of-address of attacker 1710, attacker 1700 can receive the BA message. Hence HA 235 has no way to know that the upper-level router information is wrong. Thus from then on, HA 235 will forward all packets destined for attacker 1710 to victim 1600 as an intermediate destination, thus flooding victim 1600 with unwanted packets.

Similarly, because the CoT message and HoT message are sent to the care-of-address and home-address of attacker 1710 respectively, attacker 1710 can receive both the CoT and HoT messages, allowing attacker 1710 to complete the return routability procedure. Thus CN 240 cannot detect that the ULRI in the BU message is wrong. Thus from then on, CN 240 will forward all packets destined for attacker 1710 to victim 1600 as an intermediate destination, thus flooding victim 1600 with unwanted packets.

With the present invention, HA 235 will send a BA message with a routing header specifying victim 1600 as an intermediate destination, and attacker 1710 as a final destination. So, if attacker 1710 is not attached to victim 1600, victim 1600 will not further forward the packet. Thus, attacker 1710 will not be able to receive the BA message, and hence the binding update will expires after a very short time.

Similarly, CN 240 will send a xCoT message with a routing header specifying victim 1600 as an intermediate destination, and attacker 1710 as a final destination. So, if attacker 1710 is not attached to victim 1600, victim 1600 will not further forward the packet. Thus, attacker 1710 will not be able to receive the xCoT message, and hence could not extract the xCoK token to complete the return routability procedure.

In the above descriptions, an important point to note is that victim 1600, after receiving a packet with a routing header specifying itself as an intermediate destination and MN 220 (or attacker 1710) as the next destination, will discard the packet. This is because to avert reflection attack, most nodes deployed today will only continue to forward a packet with a routing header specifying the said node as an intermediate destination if and only if the path to the next destination is not the same as the path the packet has taken to reach the said node.

In the above embodiments, although the invention has been described in what is conceived to be the most practical and preferred embodiment, it will be appreciated by those skilled in the art that various modifications may be made. For instance, it is also possible that cryptographic tokens and checksum are used for checking the validity of ULRI. Although the cases are described in the above embodiments of the present invention where an upper-level router is MR, it should be obvious that the present invention can be applied to the cases where an upper-level router is a fixed access router for achieving similar scenarios and advantages.

INDUSTRIAL APPLICABILITY

The present invention has the advantage of verifying if upper-level router information (information on the upper-level router with respect to a predetermined node) is valid. The present invention can be applied to the field of the communication technology using IP, in particular to the technology of route optimization among communication nodes using Mobile IPv6, and to the security technology to improve security of communication networks.

The invention claimed is:

1. A network managing method in a communication system, the communication system comprising a first communication node which is attached to a sub-network, a second communication node which is a correspondent node for the first communication node, and a router which is in the sub-network or an upper-level network of the sub-network, the network managing method for verifying if certain information is identification information of the router, comprising:

a step where the first communication node acquires the certain information;

a step where the first communication node generates a first message including the certain information, and sends the first message to the second communication node;

a step where the second communication node generates a second message to reply to the first message and sends the second message to the first communication node, the second message being set so as to be routed to the first communication node via an intermediate router based on the certain information included in the first message, the intermediate router being identified by the certain information;

a step where the intermediate router being identified by the certain information intercepts the second message; and a step where the intermediate router being identified by the certain information forwards the second message to the first communication node in a case that the certain information is the identification information of the intermediate router itself, and discards the second message in a case that the certain information is not the identification information of the intermediate router itself.

2. The network managing method according to claim 1 wherein the first communication node determines that the certain information is the identification information of the intermediate router by receiving the second message.

3. The network managing method according to claim 1 further comprising a step where the first communication node generates a third message to reply to the second message and sends the third message to the second communication node when receiving the second message, wherein the second communication node determines that the certain information is the identification information of the intermediate router by receiving the third message.

4. The network managing method according to claim 3 wherein the second communication node sets up an allowed response time, and determines that the certain information is the identification information of the intermediate router if the second communication node has received the third message within the allowed response time.

5. The network managing method according to claim 4 wherein the first message is a binding update message, the second message is a binding acknowledgement message, and the allowed response time is a lifetime of a binding update, and wherein verification is performed if the certain information is the identification information of the intermediate router when a binding update procedure is performed between the first and second communication nodes.

6. The network managing method according to claim 3 wherein the second communication node inserts information for verification into the second message, wherein the first communication node inserts the information for verification or information generated on the basis of the information for verification into the third message, and wherein the second communication node determines that the certain information is the identification information of the intermediate router when the second communication node has verified that the third message is a valid reply to the second message from the information for verification or the information generated on the basis of the information for verification in the third message.

7. The network managing method according to claim 6 wherein the second message is an Internet Control Message Protocol (ICMP) echo-request message and the third message is an ICMP echo-reply message.

8. The network managing method according to claim 6 wherein the first message is a message sent at a same time as a Home Test Init (HoTI) or Care-of Test Inn (CoTI) message in a return routability procedure, wherein the second message is a message sent at a same time as Home Test (HoT) and Care-of Test (CoT) messages in the return mutability procedure and comprises pre-determined token information as the information for verification, wherein the third message is a binding update message including a checksum generated using each of a Home Keygen Token (HoK) in the HoT message, a Care-of Keygen Token (CoK) in the CoT message, and the pre-determined token information in the second message, and wherein the verification is performed if the pre-determined token information is the identification information of the intermediate router when the return routability procedure is performed from the first communication node to the second communication node.

9. The network managing method according to claim 1, wherein the second communication node inserts a routing header to the second message so as to traverse an intermediate router identified by the certain information, and wherein the intermediate router updates the routing header in the second message when forwarding the second message to the first communication node.

10. A network managing apparatus in a communication system, the communication system comprising a first communication node which is attached to a sub-network, a second communication node which is a correspondent node for the first communication node, and a router which is in the sub-network or an upper-level network of the sub-network, the network managing apparatus for verifying if certain information is identification information of the router, the network managing apparatus being disposed in the first communication node and comprising:

a message acquiring unit for acquiring the certain information;

a first message generating and sending unit for generating a first message including the certain information, and sending the first message to the second communication node;

a second message receiving unit for receiving a second message sent by the second communication node to reply to the first message, the second message being set so as to be routed to the first communication node via an intermediate router based on the certain information included in the first message; and a determining unit for determining that the certain information is the identification information of the intermediate router in a case that the second message is received by the second message receiving unit.

11. The network managing method according to claim 10, wherein the second communication node inserts a routing header to the second message so as to traverse an intermediate router identified by the certain information.

12. A network managing apparatus in a communication system, the communication system comprising a first communication node which is attached to a sub-network, a second communication node which is a correspondent node for the first communication node, and a router which is in the sub-network or an upper-level network of the sub-network, the network managing apparatus for verifying if certain information is identification information of the router, the network managing apparatus being disposed in the first communication node and comprising:

a message acquiring unit for acquiring the certain information;

a first message generating and sending unit for generating a first message including the certain information, and sending the first message to the second communication node;

a second message receiving unit for receiving a second message sent by the second communication node to reply to the first message, the second message being set so as to be routed to the first communication node via an intermediate router based on the certain information included in the first message; and a third message generating and sending unit for generating a third message to reply to the second message and sending the third message to the second communication node.

13. The network managing method according to claim 12 wherein the third message generating and sending unit comprises an information generating unit for generating information to be inserted into the third message, the information being based on information for verification inserted into the second message by the second communication node or information generated on the basis of the information for verification.

14. The network managing apparatus according to claim 13 wherein the second message is an Internet Control Message Protocol (ICMP) echo-request message and the third message is an ICMP echo-reply message.

15. The network managing apparatus according to claim 13 wherein the first message is a message sent at a same time as a Home Test Init (HoTI) or Care-of Test Init (CoTI) message in a return routability procedure, wherein the second message is a message sent at a same time as Home Test (HOT) and Care-of Test (CoT) messages in the return routability procedure and comprises pre-determined token information as the information for verification, wherein the third message is a binding update message including a checksum generated using each of a Home Keygen Token (HoK) in the HoT message, a Care-of Keygen Token (CoK) in the COT message, and the pre-determined token information in the second message, and wherein the verification is performed if the pre-determined token information is the identification information of the intermediate router when the return routability procedure is performed from the first communication node to the second communication node.

16. A network managing apparatus in a communication system, the communication system comprising a first communication node which is attached to a sub-network, a second communication node which is a correspondent node for the first communication node, and a router which is in the sub-network or an upper-level network of the sub-network, the network managing apparatus for verifying if certain information is identification information of the router, the network managing apparatus being disposed in the second communication node and comprising:

a first message receiving unit for receiving a first message including the certain information from the first communication node;

a second message generating and sending unit for generating a second message to reply to the first message, and sending the second message to the first communication node, the second message being set so as to be routed to the first communication node via an intermediate router based on the certain information included in the first message;

a third message receiving unit for receiving a third message sent by the first communication node to reply to the second message; and a determining unit for determining that the certain information is the identification information of the intermediate router in a case that the third message is received by the third message receiving unit.

17. The network managing apparatus according to claim 16, further comprising an allowed response time setting unit for setting up an allowed response time of the third message in the second message, wherein the network managing apparatus determines that the certain information is the identification information of the intermediate router when the network managing apparatus has received the third message within the allowed response time.

18. The network managing apparatus according to claim 17 wherein the first message is a binding update message, the second message is a binding acknowledgement message, and the allowed response time is a lifetime of a binding update, and wherein verification is performed if the certain information is the identification information of the intermediate router when a binding update procedure is performed between the first and second communication nodes.

19. The network managing apparatus according to claim 16 wherein the second message generating and sending unit inserts information for verification into the second message, wherein the determining unit determines that the certain information is the identification information of the intermediate router when having verified that the third message is a valid reply to the second message from the information for verification or the information generated on the basis of the information for verification inserted in the third message by the first communication node.

20. The network managing apparatus according to claim 19 wherein the second message is an ICMP echo-request message and the third message is an ICMP echo-reply message.

21. The network managing apparatus according to claim 19 wherein the first message is a message sent at a same time as a HoTI or CoTI message in a return routability procedure, wherein the second message is a message sent at a same time as HoT and CoT messages in the return routability procedure and comprises pre-determined token information as the information for verification, wherein the third message is a binding update message including a checksum generated using each of a HoK in the HoT message, a CoK in the CoT message, and the pre-determined token information in the second message, and wherein the verification is performed if the pre-determined token information is the identification information of the intermediate router when the return routability procedure is performed from the first communication node to the second communication node.

* * * * *